United States Patent Office 3,500,800
Patented Mar. 17, 1970

3,500,800
INTERNAL COMBUSTION ENGINE WITH CYLINDERS IN V-ARRANGEMENT
Josef Reisacher, Fellbach, Wurttemberg, and Wolfgang Rapp, Esslingen (Neckar), Germany, assignors to Daimler-Benz, Aktiengesellschaft, Stuttgart-Unterturkheim, Germany
Filed Feb. 1, 1968, Ser. No. 702,236
Claims priority, application Germany, Feb. 3, 1967, D 52,190
Int. Cl. F02b 3/00
U.S. Cl. 123—32     23 Claims

ABSTRACT OF THE DISCLOSURE

An internal combustion engine with cylinders in V-arrangement which includes for each cylinder an injection nozzle and glow or spark plug together with a rotary movement of the air in the combustion space whereby the injection nozzle and the glow or spark plug are arranged in the direction of rotation of the air between the inlet valve and the exhaust valve on that side in relation to the axial longitudinal plane extending through the respective cylinder axis of the cylinder or cylinders of a cylinder row which faces the longitudinal plane of symmetry, indicated by the direction of arrow $v$ in FIGURE 2 of the V-type engine.

BACKGROUND OF THE INVENTION

The present invention relates to an internal combustion engine with cylinders in V-arrangement having a rotary movement of the air within the combustion space as well as including an injection nozzle and glow or spark plug.

SUMMARY OF THE INVENTION

Injection nozzles and glow or spark plugs require in general frequent servicing. Accordingly, it is an aim of the present invention to arrange these parts at a place of the engine which is particularly readily accessible. Simultaneously, however, proper attention must also be given to as favorable as possible an arrangement thereof within the combustion space with due consideration to the flow conditions prevailing thereat.

The underlying problems are solved in accordance with the present invention in that the injection nozzle and glow or spark plug are arranged, in the direction of the rotary movement of the air, between inlet and exhaust valve on that side in relation to the axial longitudinal plane extending through the cylinder axis of the cylinder or of the cylinders of a cylinder row, which faces the center longitudinal plane of symmetry of the V-engine. Such an arrangement assures, on the one hand, an advantageous injection, distribution and ignition of the fuel and produces, on the other, a particularly good accessibility from above, as is advantageous in particular for truck-type engines. Since with valves controlled by means of push rods, the valve-play readjustment also takes place for the most part from above, the places at the cylinder head of the engine to be attended and serviced can thereby lie close together which increases the ability to inspect the same and further facilities the servicing.

It is particularly advantageous if, with an arrangement of inlet and exhaust valves in mutually offset cross planes, the inlet valve is arranged offset toward the inside and the exhaust valve offset toward the outside in relation to the axial longitudinal plane extending through the cylinder axis and if the injection nozzle as well as glow or spark plug are arranged within the angle between the inlet and exhaust valve approximately within the area of the cross plane containing the exhaust valve and approximately within the area of the longitudinal center plane containing the inlet valve. The injection nozzle and glow or spark plug can thereby be located so as to be accessible in a particularly good manner, and more particularly, also, if the essentially inwardly disposed inlet line is extended in an arc above the cylinder head from the inside up to approximately the outside in order to discharge at the inlet valve tangentially into the combustion space from the outside. The glow or spark plug is thereby disposed appropriately upstream of the injection nozzle as viewed in the direction of rotation of the air and closer to the longitudinal plane of symmetry of the engine than the injection nozzle.

Accordingly, it is an object of the present invention to provide a V-type internal combustion engine which obviates the aforementioned shortcomings and drawbacks encountered in the prior art.

Another object of the present invention resides in a V-type internal combustion engine in which servicing of the various parts such as injection nozzles, glow plug or spark plug, etc. is greatly facilitated.

A still further object of the invention resides in a V-type internal combustion engine in which the various parts requiring frequent servicing and maintenance are not only readily accessible but are so arranged as to take properly into consideration the flow conditions of the air or fuel-air mixture prevailing in the combustion spaces.

Still another object of the present invention resides in a V-type internal combustion engine which assures an advantageous injection, a favorable fuel distribution and a reliable ignition of the fuel without impairing the accessibility to those parts of the combustion engine which require the most frequent attention for servicing.

These and further objects, features, and advantages of the present invention will become more obvious from the following description when taken in connection with the accompanying drawing which shows, for purposes of illustration only, one embodiment in accordance with the present invention, and wherein.

Figure 1:
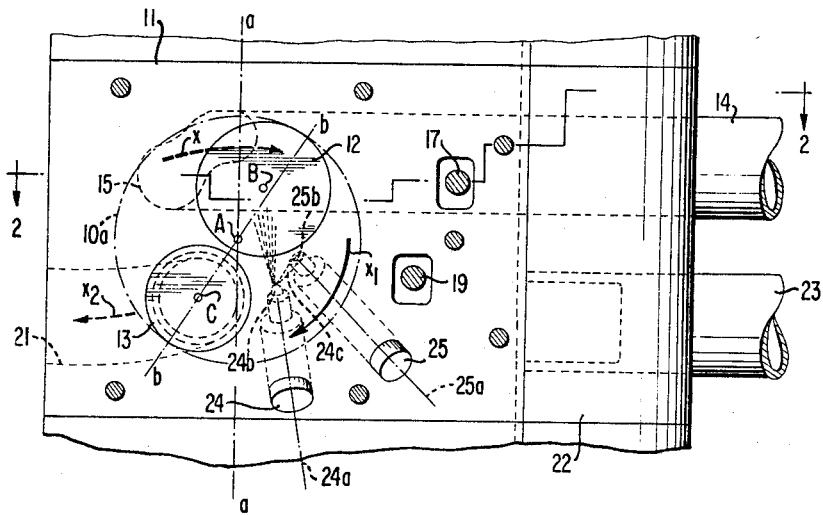
FIGURE 1 is a bottom plan view of a cylinder head of one cylinder row of a V-type internal combustion engine in accordance with the present invention, and more particularly as viewed from below in cross section along line 1—1 of FIGURE 2.
Figure 2:
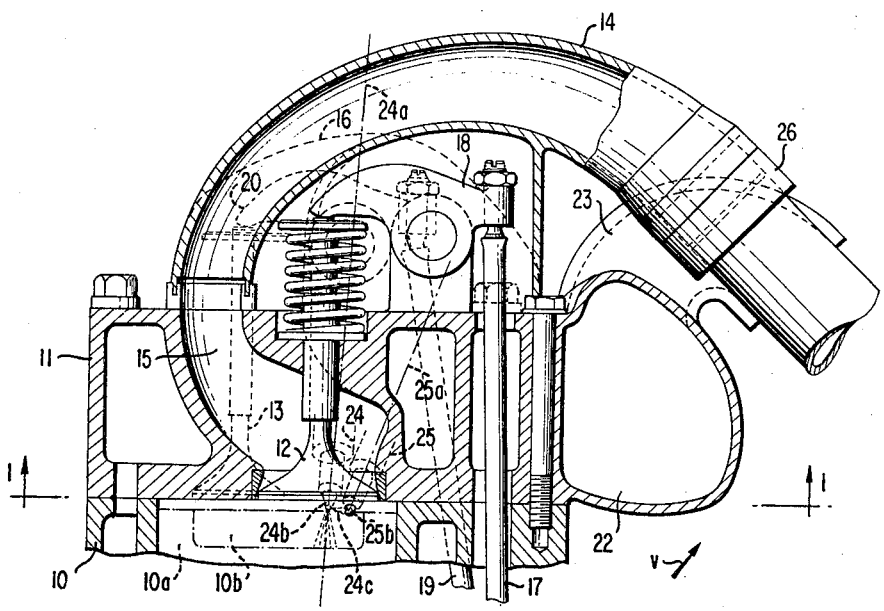
FIGURE 2 is a cross-sectional view taken along line 2—2 of FIGURE 1.
Figure 3:
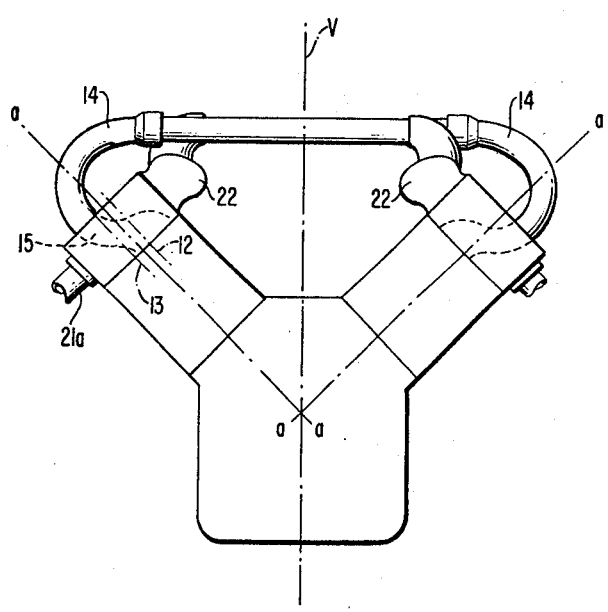
FIGURE 3 is a somewhat schematic front elevational view of a V-type internal combustion engine in accordance with the present invention.

Referring now to the drawing wherein like reference numerals are used throughout the two views to designate corresponding parts, it is assumed that the direction of the center plane of symmetry of the engine between the two rows of cylinders arranged to each other in the form of a "V" of which only one row of cylinders is partly shown, is indicated schematically as to its general direction in FIGURE 2 by the arrow V, the actual location of the plane of symmetry V of the engine being indicated in FIGURE 3. The engine is constructed as a rule as series or in-line engine with several cylinders in each of the two cylinder rows arranged in the shape of a V; however, it is understood that each of these rows may consist only of a single cylinder.

The cylinder head 11, for example, a water-cooled cylinder head, is threadably secured in the usual manner on the cylinder block 10 of a cylinder row having the piston 10a, which is indicated in the drawing, for example, in its upper dead-center position and whose central recess 10b which may be disposed either coaxially or more or less eccentrically, forms simultaneously the combustion space. The cylinder head 11 is provided within the cylinder circumference with an inlet valve 12 and with an exhaust valve 13 whereby the inlet valve 12 is arranged offset toward the inside of the V-engine in relation to the axial longitudinal plane a—a extending through the cylinder axis A, and the exhaust valve 13 is arranged offset toward the outside in relation to the plane a—a, preferably, however, in such a manner that the axis B of the inlet valve 12 is disposed offset toward the outside in relation to the plane b—b extending through the axis C of the exhaust valve 13 and the cylinder axis A.

The charging air is supplied to the inlet valve 12 from an inlet line arranged in the V of the two cylinder rows, preferably, however, arranged at the oppositely disposed cylinder row, by way of a connecting line 14 and the inlet chamber 15 within the cylinder head 11 whereby the connecting line 14 extends at an arc above the cylinder head 11 and discharges into the inlet channel 15 from above which leads toward the inlet valve 12 in the direction from the outside. The threadably secured valve hood 16 may be made in one piece with the connecting line 14 and may cover both the inlet valve 12 as well as also the exhaust valve 13 together with the controls thereof. The inlet valve 12 is controlled by means of a push rod 17 and a rocker arm 18 while the exhaust valve 13 is controlled by means of a push rod 19 and a rocker arm 20.

The push rods 17 and 19 are thereby disposed on the inner side of the cylinder head 11 which faces the plane of symmetry of the V-engine whereas the rocker arms 18 and 20 are supported at bearing mounts on the cylinder head 11.

The inlet channel 15 discharges approximately tangentially at the inlet valve 12 in the direction of arrow $x$ so that a rotary movement in the direction of arrow $x_1$ is imparted to the charging air within the cylinder or within the combustion space formed by the piston recess 10b. In the same direction the burned exhaust gases may also escape at the exhaust valve 13 in the direction of arrow $x_2$ out of the exhaust channel 21 toward the outside by way of exhaust line 21a.

An inlet line 22, for example, made in one piece with the cylinder head 11, which corresponds to that inlet line that is arranged at the opposite cylinder row and which supplies the connecting line 14 as well as the inlet channel 15, serves as inlet line for the cylinders of the opposite cylinder row with which it is connected by way of a line 23 corresponding to the line 14.

According to the present invention, the injection nozzle 24 as well as a glow plug 25 or a corresponding spark plug are arranged on the inside of the cylinder in relation to the axial longitudinal plane a—a, and more particularly within the angle which is formed within the area of the cross plane containing the exhaust valve 13 and within the area of the longitudinal plane containing the inlet valve 12 of the engine between the inlet valve 12 and the exhaust valve 13. The injection nozzle 24 and glow or spark plug 25 are appropriately arranged with their axes 24a and 25a in such a manner that they extend through the valve hood 16 and are accessible from the outside, i.e., can be installed and removed without removal of the valve hood 16. Preferably, the nozzle orifice 24b and the glow wire 25b of the glow plug (or the corresponding part of the spark plug) are approached to the cylinder axis A to such an extent that they lie over the outer portions of the possibly approximately circularly shaped recess 10b provided in the piston bottom, which is made possible with respect to the glow plug 25 above all also by reason of the arrangement of the inlet valve axis B on the opposite side of the plane b—b. Glow plug (spark plug) and injection nozzle are thereby swept appropriately by the air stream rotating in the direction of rotation $x_1$ shortly after passage thereof through the valve gap of the inlet valve 12. The fuel is furthermore advantageously injected into the combustion space in several, for example two or three, jets whereby one of these jets, designated by reference numeral 24c is directed approximately against the glow plug wire 25b and is intended to hit the glow plug wire with its split-up or broken-up jet edge.

While we have shown and described only one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. In an internal combustion engine with at least two cylinders in V-like arrangement and having a plane of symmetry, cylinder head means for each cylinder, an inlet valve and an exhaust valve for each cylinder arranged in the cylinder head means thereof, and inlet line means and exhaust line means, characterized in that the inlet valve of a cylinder is located substantially on the side of the cylinder facing the plane of symmetry of the V-like arrangement and the corresponding outlet valve is located substantially on the side of the cylinder opposite said plane of symmetry, and in that the in-flowing air flowing past the inlet valve produces a rotary flow in the direction toward said plane of symmetry within the cylinder about the cylinder axis by an approximately tangential discharge of the inlet line means into the cylinder at the inlet valve with a flow component of the in-flowing air, as it enters the cylinder, in the direction toward said plane of symmetry, and ignition means and injection means terminating in the cylinder between the respective inlet valve and outlet valve, as viewed in the direction of flow of the rotating air, the outlet line means leading from the outlet valve toward the side of the cylinder opposite said plane of symmetry.

2. In an internal combustion engine, the combination according to claim 1, characterized in that the inlet valve is located in reference to a plane perpendicular to the plane of symmetry and extending approximately through the center of the cylinder, substantially on the one side of said perpendicular plane on which the rotating air flows in the direction toward said plane of symmetry, and in that the outlet valve is located substantially on the other side of said perpendicular plane on which the rotating air flows in the direction away from said plane of symmetry.

3. In an internal combustion engine, the combination according to claim 2, characterized in that the inlet line means extends to a cylinder from the space between the two cylinders over the corresponding cylinder head means to the side of the cylinder opposite said plane of symmetry.

4. In an internal combustion engine, the combination according to claim 3, characterized in that each cylinder includes only one inlet valve and one outlet valve, and in that the inlet valve, the ignition means, and the injection means are located on the side of a plane substantially parallel to the plane of symmetry and extending substantially through the center of the cylinder which faces said plane of symmetry, while the outlet valve is located substantially on the opposite side of said parallel plane.

5. In an internal combustion engine, the combination according to claim 4, characterized in that the ignition means and injection means are located within the cylinder area between said perpendicular plane and parallel plane on said other side of said perpendicular plane.

6. In an internal combustion engine, the combination according to claim 5, characterized in that said ignition means is located upstream of said injection means, as viewed in the direction of flow of the air in the cylinder.

7. In an internal combustion engine, the combination according to claim 6, characterized in that the axis of the inlet valve is offset toward the side away from said plane of symmetry in relation to a plane extending through the axis of the exhaust valve and the cylinder axis.

8. In an internal combustion engine, the combination according to claim 7, characterized by a piston in a respective cylinder which is provided with a piston recess substantially forming a combustion space surrounded by a rim.

9. In an internal combustion engine, the combination according to claim 8, characterized in that said injection means provided with several fuel jets, one of said fuel jets being directed against said ignition means.

10. An internal combustion engine according to claim 9, further comprising push rod means for the inlet and exhaust valve arranged on said one side of a respective cylinder.

11. An internal combustion engine according to claim 10, further comprising adjusting means for the push rod means actuating the valve by way of rocker arm means, said adjusting means being arranged below the inlet line means extending in an arc over the cylinder head means.

12. An interial combustion engine according to claim 11, wherein the injection means and ignition means extend through a valve hood means for purposes of accessibility from the outside.

13. In an internal combustion engine, the combination according to claim 1, characterized in that the axis of the inlet valve is offset toward the outside away from said plane of symmetry in relation to a plane extending through the axis of the exhaust valve and the cylinder axis.

14. In an internal combustion engine, the combination according to claim 1, characterized in that the ignition means is arranged upstream of the injection means, as viewed in the direction of flow of the air and closer to said plane of symmetry than the injection means.

15. In an internal combustion engine, the combination according to claim 14, characterized in that the injection means provides several fuel jets, one of said fuel jets being directed against the ignition means.

16. In an internal combustion engine, the combination according to claim 1, characterized in that the inlet line means extends to a cylinder from the space between the two cylinders over the corresponding cylinder head means toward the side of the cylinder opposite said plane of symmetry, and in that said inlet line means discharges into the combustion space formed within the cylinder approximately tangentially thereto and in the direction toward the plane of symmetry.

17. An internal combustion engine according to claim 1, further comprising push rod means for the inlet and exhaust valves arranged on the said one of a respective cylinder relative to said symmetry plane.

18. An internal combustion engine according to claim 17, further comprising adjusting means for the push rod means actuating the valves by way of rocker arm means, said adjusting means being arranged below the inlet line means extending in an arc over the cylinder head.

19. In an internal combustion engine, the combination according to claim 1, characterized in that each cylinder includes only one inlet valve and one outlet valve, and in that the inlet valve, the ignition means and the injection means are located on the side of a plane substantially parallel to the plane of symmetry and extending substantially through the center of the cylinder which faces said plane of symmetry, while the outlet valve is located substantially on the opposite side of said parallel plane.

20. In an internal combustion engine, the combination according to claim 19, characterized in that the ignition means and injection means are located within the cylinder area between said perpendicular plane and parallel plane on said other side of said perpendicular plane.

21. In an internal combustion engine, the combination according to claim 1, characterized in that said ignition means is located upstream of said injection means, as viewed in the direction of flow of the air in the cylinder.

22. In an internal combustion engine, the combination according to claim 20, characterized in that the inlet valve is located in reference to a plane perpendicular to the plane of symmetry and extending approximately through the center of the cylinder, substantially on the one side of said perpendicular plane on which the rotating air flows in the direction toward said plane of symmetry, and in that the outlet valve is located substantially on the other side of said perpendicular plane on which the rotating air flows in the direction away from said plane of symmetry.

23. An internal combustion engine according to claim 13, wherein the piston in a respective cylinder is provided with a piston recess essentially forming a combustion space which is surrounded by a rim.

References Cited

UNITED STATES PATENTS

| 2,269,104 | 1/1942 | Hedlund | 123—32 |
| 2,902,011 | 9/1959 | Hoffmann | 123—32 |
| 2,963,009 | 12/1960 | Dolza | 123—52 XR |
| 2,974,654 | 3/1961 | Bouvy | 123—52 XR |
| 3,020,899 | 2/1962 | Mueller | 123—32 |

LAURENCE M. GOODRIDGE, Primary Examiner

U.S. Cl. X.R.

123—119, 139